P. KRAUSE.
EMERGENCY STOP FOR MOTOR VEHICLES.
APPLICATION FILED NOV. 12, 1907.

918,680.

Patented Apr. 20, 1909.

WITNESSES
Chas. A. Clark
C. W. Fairbank

INVENTOR
Paul Krause
BY
ATTORNEYS

UNITED STATES PATENT OFFICE.

PAUL KRAUSE, OF BABYLON, NEW YORK.

EMERGENCY-STOP FOR MOTOR-VEHICLES.

No. 918,680.   Specification of Letters Patent.   Patented April 20, 1909.

Application filed November 12, 1907.  Serial No. 401,791.

*To all whom it may concern:*

Be it known that I, PAUL KRAUSE, a citizen of the United States, and a resident of Babylon, in the county of Suffolk and State of New York, have invented a new and Improved Emergency-Stop for Motor-Vehicles, of which the following is a full, clear, and exact description.

This invention relates to certain improvements in motor vehicles, and more particularly to an emergency stop mechanism whereby the brakes may be applied and the engine stopped by a passenger other then the chauffeur, should said chauffeur be unable or unwilling to act in an emergency.

The mechanism involves an auxiliary brake lever normally out of use, but serving to not only apply the emergency brakes but also to break the circuit to the sparker and thus stop the engine. This emergency lever may be located in such a position as to be readily operated by a passenger on the rear seat of a two-seated vehicle, or by a person seated beside the chauffeur, or, if desired, two of the emergency levers may be employed, one for the front and one for the rear seat.

Reference is to be had to the accompanying drawings, forming a part of this specification, in which similar characters of reference indicate corresponding parts in all the figures, and in which—

Figure 1:
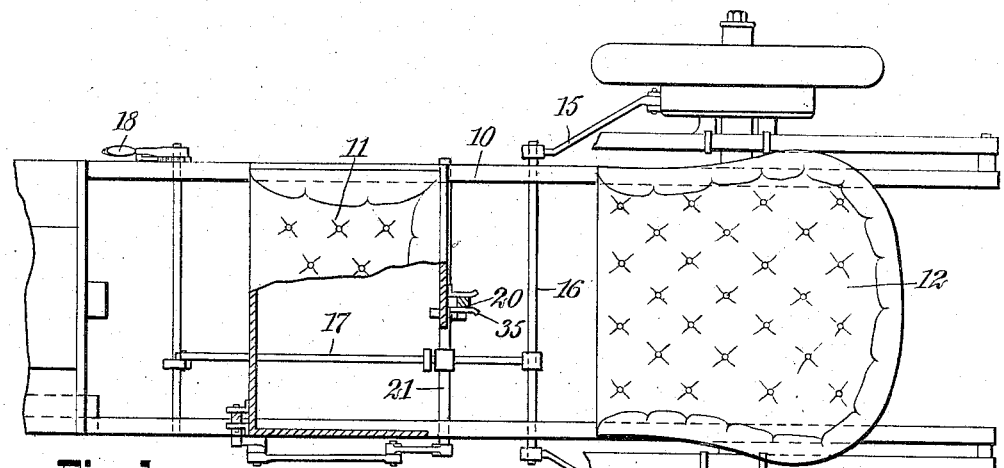
Figure 2:
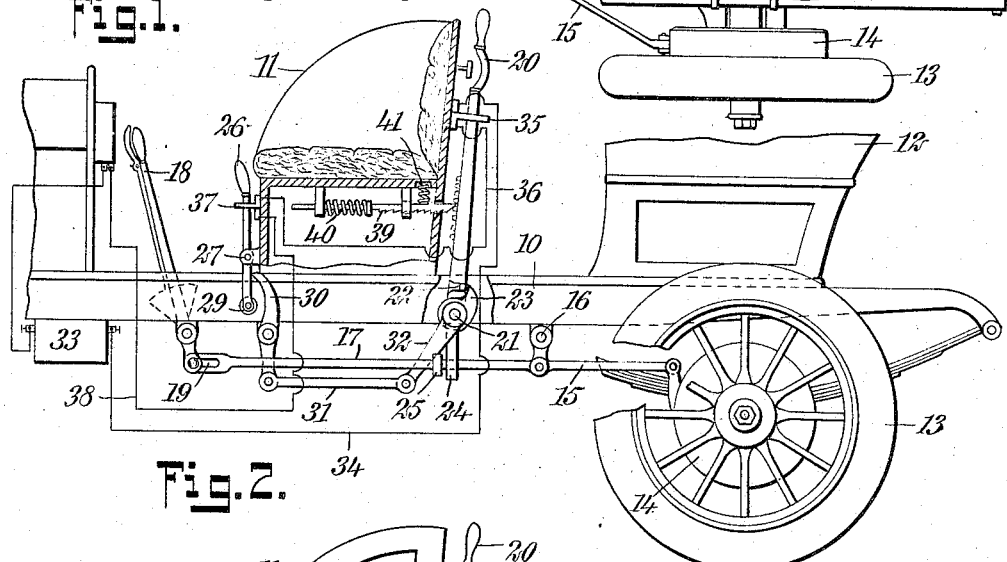
Figure 3:
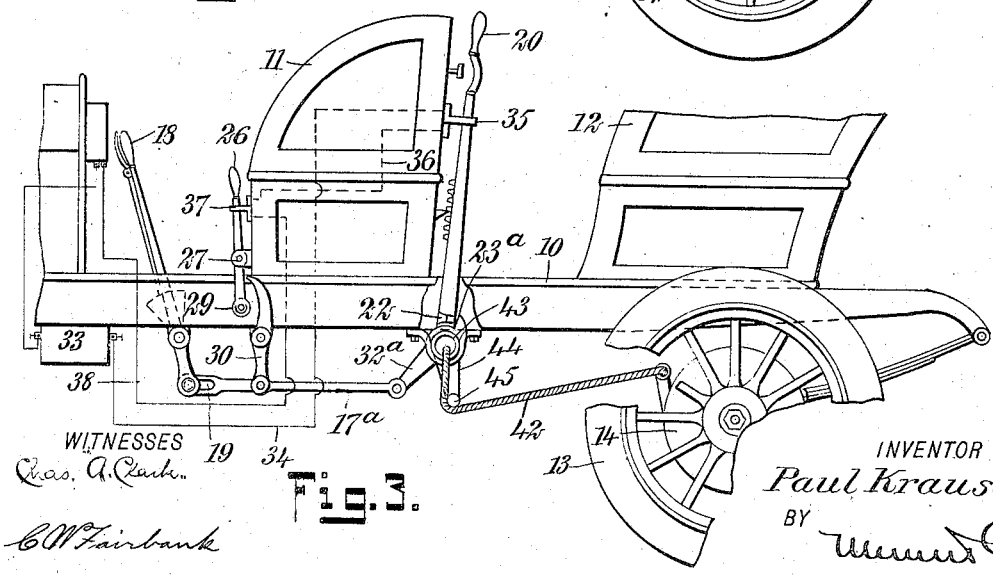

Figure 1 is a top plan view of a portion of a vehicle constructed in accordance with my invention; Fig. 2 is a side elevation thereof, showing a portion of the mechanism in section; and Fig. 3 is a side elevation showing a somewhat modified construction.

My improvement is adapted for use in connection with any form of motor vehicle but is especially adapted to motor vehicles operated by internal combustion engines. In the drawings I have illustrated a portion of a vehicle frame 10, having a front seat 11 and a rear seat 12. Upon the rear wheels 13 are mounted any suitable type of emergency brakes 14, connected by links 15 to a rock shaft 16, the latter being connected by a draw bar 17 leading to the front portion of the vehicle. An ordinary emergency brake lever 18, is mounted on the right-hand side of the vehicle frame, slightly in front of the front seat 11, and is in position to be operated by the right hand of the chauffeur. These parts of the construction involve no special improvement, but may be of any suitable form commonly used on the market.

The draw bar 17 is connected to the lower end of the emergency brake lever 18 by a slot and pin forming lost motion connections 19, whereby the draw bar 17 may be moved forward independently of the ordinary emergency brake lever 18. The mechanism involving my invention is connected directly to this draw bar for moving it forward to apply the brakes without moving the brake lever 18, and is so constructed that the brakes may be applied by the brake lever 18 in the ordinary manner without affecting my mechanism.

In the specific construction illustrated in the drawings, I provide an auxiliary brake lever 20, pivoted to the vehicle frame just back of the front seat and within easy reach of a passenger riding on the rear seat. The lower end of the lever is pivoted on a rock shaft 21, and carries a laterally-extending lug 22, which engages with a projection 23 on a collar carried by said rock shaft. The lug is normally in engagement with one side of the projections or tooth 23, so that the rearward movement of the lever causes the rock shaft 21 to rotate, but the rock shaft may rotate independently of this lever. The rock shaft 21 carries a downwardly-projecting arm 24, having an aperture therein through which passes the draw bar 17, and the draw bar is provided with a stop 25 normally lying just in front of said arm. The draw bar may be moved forward to apply the brakes independently of said arm 24, but the forward movement of the arm also operates to apply the brakes independently of the lever 18. A second auxiliary brake lever 26, is preferably disposed adjacent the front seat but upon the left-hand side, so as to be within easy reach of a person seated beside the chauffeur. This lever, as illustrated, is pivoted on a stationary pivot 27, intermediate its ends, and its lower end carries a roller 29 adapted to engage with the upper end of a lever 30. This latter lever is pivoted intermediate its ends, and its lower end is connected by a link 31 to an arm 32 on the rock shaft 21.

Any suitable igniting system may be employed in connection with the internal combustion engine used for propelling the vehicle, but a portion of the circuit passes adjacent the emergency lever 20 and also adjacent the emergency lever 26, so as to be broken when either of these levers is operated. As shown, the vehicle carries a battery box 33, and the wire 34 leading therefrom is connected to one of a pair of spring clips 35, which serve to hold the lever 20 in place. The lever is wedged between the two clips, and the circuit passes from one clip through the lever itself to the other clip, and thence through a wire 36 to a similar pair of spring clips 37 which hold the lever 26 in place. From the second of this pair, a wire 38 leads back to the engine frame, the induction coil, the spark plug, or other portion of the vehicle, depending upon the nature of the ignition system; the particular system involving no part of my invention.

In the operation of this specific form, the emergency brakes may be applied by the chauffeur upon the proper manipulation of the lever 18, but in case of any accident to the chauffeur, or his failure from any other cause to apply the brakes to stop the car, either a passenger seated beside the chauffeur or a passenger upon the rear seat, may operate the lever 20 or the lever 26 to not only apply the brakes, but also to break the ignition circuit. Any suitable means may be employed for holding the lever to hold the brakes in their set position upon the operating of either of the levers. As shown, a ratchet bar 39 is disposed beneath the front seat and held in engagement with the side of the lever 20 by a coil spring 40. As the lever is operated the ratchet bar is forced outward and prevented from returning by the engagement of the teeth with the side of the opening through which the bar passes. The side of the lever 20 may, if desired, be provided with teeth to prevent the end of the ratchet bar from slipping upward, and a second coil spring 41 may also be employed for this purpose.

In the construction illustrated in Figs. 1 and 2, the brakes are operated by the rotation of the rock shaft 16 and the longitudinal movement of the links. I may, if desired, employ a cable so connected as to apply exactly the same pressure to both brakes upon the operation of the lever. In the form illustrated in Fig. 3, the main features of the construction are substantially the same as illustrated in Figs. 1 and 2, but a cable 42 is provided, the opposite ends of which are connected to the two brakes and the intermediate portion of which passes through a tube 43. The tube is rotatable and is provided with an arm 44, adjacent each end, and at the outer end of each arm is a knob 45 to tighten the latter as the tube is rotated. The lever 20 is loosely mounted on the tube, and the projection 22 thereof engages with a projection 23ª corresponding to the projection 23 of the construction hereinbefore described. The draw bar 17ª is connected to a link 32ª rigid with the tube 43, and the lower end of the lever 30 is preferably directly connected to this draw bar rather than through separate connections.

The operation of the two constructions is substantially the same; that is, the brakes may be readily applied by the use of any one of the three levers independently of the other levers, and the operation of the lever 20 or the lever 26 serves to break the igniting circuit of the engine.

Having thus described my invention, I claim as new and desire to secure by Letters Patent:

1. A motor vehicle having a plurality of seats, a brake, and a plurality of operating levers therefor, one adapted to be operated from each seat.

2. A motor vehicle having a plurality of seats, a brake, an operating lever for said brake and adapted to be operated from one seat, and a second operating lever for said brake and adapted to be operated from a second seat, said levers operating independently of each other.

3. A motor vehicle having a plurality of seats, a brake, an operating lever for said brake and adapted to be operated from one seat, and a second operating lever for said brake and adapted to be operated from a second seat, said levers operating independently of each other, and one of said levers also operating to stop the motor of said vehicle.

4. A motor vehicle having a seat, a brake, an operating lever adjacent one side of said seat and connected to said brake, an operating lever adjacent the opposite side of said seat and having lost motion connections with said brake, and means whereby the operation of said second lever stops the engine.

5. A motor vehicle having a seat, a brake, an operating lever adjacent one side of said seat and connected to said brake, an operating lever adjacent the opposite side of said seat and having lost motion connections with said brake, and means whereby the operation of said second lever breaks the ignition circuit of the engine.

In testimony whereof I have signed my name to this specification in the presence of two subscribing witnesses.

PAUL KRAUSE.

Witnesses:
  JOSEPH COVERT,
  HENRIG KRAUSE.